United States Patent [19]

Jasmer et al.

[11] Patent Number: 4,891,802

[45] Date of Patent: Jan. 2, 1990

[54] METHOD OF AND CIRCUIT ARRANGEMENT FOR CONTROLLING A SWITCHING NETWORK IN A SWITCHING SYSTEM

[75] Inventors: Wolfgang E. Jasmer, Hamburg; Johann E. W. Krüger, Quickborn; Ulrich R. P. Killat, Hamburg, all of Fed. Rep. of Germany

[73] Assignee: U.S. Philips Corporation, New York, N.Y.

[21] Appl. No.: 189,275

[22] Filed: May 2, 1988

[30] Foreign Application Priority Data

Apr. 30, 1987 [DE] Fed. Rep. of Germany ....... 3714385

[51] Int. Cl.$^4$ ............................................. H04J 3/26
[52] U.S. Cl. ..................................... 370/60; 340/825.8
[58] Field of Search ...................... 370/60, 59, 58, 61, 370/67, 94; 340/826, 825.79, 825.8

[56] References Cited

U.S. PATENT DOCUMENTS

| | | | |
|---|---|---|---|
| 3,859,467 | 1/1975 | Borgstrom et al. | 370/60 |
| 3,979,733 | 9/1976 | Fraser | 340/172.5 |
| 4,049,906 | 9/1977 | Hafner et al. | 178/2 |
| 4,198,546 | 4/1980 | Schlichte | 340/826 |
| 4,577,311 | 3/1986 | Duquesné et al. | 370/60 |
| 4,771,419 | 9/1988 | Graves et.al. | 370/60 |
| 4,788,679 | 11/1988 | Kataoka et al. | 370/60 |
| 4,821,258 | 4/1989 | Fraser | 370/60 |

OTHER PUBLICATIONS

T. A. Coudreuse, "Asynchronous Time-Division Techniques: An Experimental Packet Network Integrating Videocommunication", ISS '84, (XI International Switching Symposium, Florence (Italy), May 7-11, 1984), vol. 3, Session 32C, paper 2, pp. 1-7.

Primary Examiner—Douglas W. Olms
Assistant Examiner—Melvin Marcelo
Attorney, Agent, or Firm—Thomas A. Briody; Jack E. Haken; Anne E. Barschall

[57] ABSTRACT

In a switching system, more specifically a packet switching system, the flow control of the packets can be established by way of a datagram or by implementing the method of the virtual connection. For the optimization of the flow control the selected structure of the switching network is especially important.

If the switching network is designed along the lines of a space-division multiplex switching network, each junction point of the bus bar system consisting of feeder lines and trunk lines has a comparator assigned thereto, which compares the addresses of the trunk lines arranged in columns with the routing information contained in the packet message headers. If, simultaneously, several of the auxiliary lines arranged in rows are to be connected through to one of the trunk lines arranged in a column, the order is determined by means of a decision circuit associated to each trunk line. If the order is determined by the spatial arrangement of the feeder lines, each decision circuit cyclically scans all comparators associated thereto, so that a new evaluation of the routing information is not achieved until the complete cycle has finished.

16 Claims, 4 Drawing Sheets

METHOD OF AND CIRCUIT ARRANGEMENT FOR CONTROLLING A SWITCHING NETWORK IN A SWITCHING SYSTEM

The invention relates to a method of controlling a switching network in a switching system especially a packet switching system with packetizers and pad switch arrangements connected to the lines of the system. The packets are switched through the packet switch arrangement, using asynchronous time division, on the basis of the routing information contained in the message header of the packet.

In communications networks the part of the data traffic to be transferred is steadily increasing. For managing the data traffic, separate switching systems are constructed for the data and the telephone traffic. As the data rate of the data signals to be transmitted can assume many different values, it is hard to combine data and telephone switching in one network junction. For data switching either the method of through-switching or relay switching is frequently used.

With the method of through-switching, the switching operation in a junction is characterized by the reception of a request for a connection, the evaluation of the address, the allocating of a physical path through the switch arrangement and the establishing of the connection on account of the respective request. On the other hand, the method of relay switching is characterized by the reception of a request for a connection, the evaluation of the address, the allocation of a virtual path, the evaluation of the packet message header, the distribution of the packets and the establishing of the virtual connection on account of the request.

Thus, with the method of through-switching a physical path between two subscribers is reserved only for these subscribers throughout the connection, whereas with the method of relay switching this physical path can be utilized by a plurality of subscribers. This is achieved by storing the messages in the junctions until a line is free. With the method of relay switching, the messages can have an arbitrary length when a message switching network is concerned, or be divided into packets of a limited length when a packet switching network is concerned.

In a packet switching system the flow control of the packets can be effected by a datagram or by implementing the method of the virtual connection. In the former case each packet contains the address of the receive end subscriber and subject to the network load the packets are transferred to the packet switching system. In the case of a control with a virtual connection the packets are transferred along the same link throughout the data exchange between two subscribers.

When optimizing such a packet switching system, the marginal conditions with respect to the capability, the monitoring of the flow and the flow control especially have to be taken into consideration. The method of flow control in a packet switching system has to enable a rapid adaptation of the network in case of a breakdown or a considerable change in the traffic offered, for which each packet switching system has to possess as much information on the condition of the network as possible to be able to compute a suitable alternative route. In case of a divided control the decision on the packet routing lies with each packet switch arrangement. In the packet switch arrangement the packets can also be switched through in accordance with the principle of the asynchronous time-division technique, as appeared, for example, from the lecture entitled "Asynchronous Time-Division Techniques" by Coudreuse et al., held at the ISS 84, France 7–11 May 1984 (session 32 C paper 2, pp. 1 to 7).

The through-switching of packets in the packet switch arrangement according to the principle of the asynchronous time-division technique will be further described and explained with reference to the FIGS. 1 and 2.

Each data source at the subscriber end is equipped with a so-called packetizer PAD, which supplies so-called frames to the subscriber line.

A frame, or packet P, respectively, contains a message header H and the actual data D.

The message header H itself has various identification codes VC, in order to distinguish from each other different virtual channels on the subscriber line or a line in the network, and routing information RI. By means of the routing information RI the switching network is controlled in the packet switch arrangement, whilst hereinafter it is assumed that a frame contains the routing information RI for the switching networks to be passed through, and it is assumed that all frames are of the same length.

Networks can also be designed, (a) in which the routing information RI applies to the switching network to be passed through next or (b) in which no routing information RI is contained in the messaage header H.

In the case of (a) the values for the identification code VC and the routing information RI which are valid at the input of the switching network are exchanged for new values of VC and RI on leaving the switching network. The information for this translation step can be derived either from the old values by way of algorithms or produced in the signalling phase of virtual connections and arranged in Tables. Typically enough, arrangements denoted header-translator-circuits HU, realizing the exchange of the VC, RI values, would be arranged in the subscriber lines A of the switching network to be passed through.

In the case of (b) the message header H is extended by a value for the routing information RI at the input of the switching network. The value for the routing information RI can be derived either from the value for the identification code VC by way of algorithms, or produced in the signaling phase of virtual connections and arranged in Tables. On the subscriber lines A of the switching network on values of the routing information RI are passed on.

From DE-PS 26 20 220 is known a switch for transferring packets through a temporary store in a time-division multiplex data communications system, by means of which in the self-controlling switching network using a queue control an actual communications path is created for the packets. With the aid of the switching network control known from that Patent it is not feasible to construct a switching network in the space-division technique.

Furthermore, from DE-AS 26 14 086 a communications network is known for transmitting digital messages via various exchanges, in which the routing information RI is evaluated in each packet switch arrangement and in which the routing information RI is shortened according as the packet is switched through in the packet switch arrangement. Those skilled in the art may be assumed to be familiar with various queue controls in which the packets are sorted according to time and/or priority. However, no state of the art proposal is known to construct switching networks in packet switching systems such that space-division multiplex switching networks and associated control circuits, as they are known from the telephone switching technique, are provided in a packet switching system.

The invention has for its object to provide a method of controlling a switching network in a switching system such that the switching network can be constructed in the same way as is known for space-division multiplex switching networks in the telephone switching technique.

This object is achieved according to the invention by means of a method characterized in that for switching through a bus system constructed as a space-division multiplex switching network of feeder lines and trunk lines, the address of the trunk lines arranged in columns is compared to the routing information by means of comparators associated with junction points. The method is further characterized in that when there is a multiple match, the order of the feeder lines to be switched through and arranged in rows is determined by decision circuits associated to the trunk lines.

With the method of switching network control according to the invention, the connection of an unlimited number of auxiliary lines and trunk lines is made possible as a result of the parallel processing of the information contained in the message header by the switching network control. The evaluation of the routing information contained in the message header is effected in a decentralized way when the method according to the invention is implemented.

Further embodiments of the method according to the invention are described in the further Patent Claims. The circuit arrangement for implementing the method according to the invention requires little circuit cost and design effort and as a result of the modular concept enables the construction of switching networks of any size.

The invention will be further described and explained hereinafter with reference to various embodiments shown in the drawing, in which.

Figure 1:
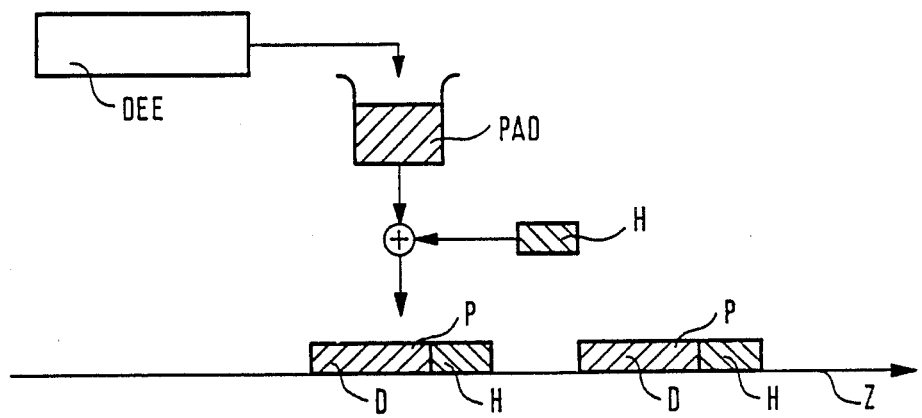
FIG. 1 shows the receive-end equipment in a switching system.

FIG. 1 shows in a simplified way the subscriber-end generation of the packets P for transmitting a message from a data terminal DEE. By means of the packetizer PAD the message is segmented into unit packets of a defined length and provided with a message header H. The thus formed unit packets are transmitted through feeder line Z to the switch arrangement, especially the packet switch arrangement.

Figure 2:
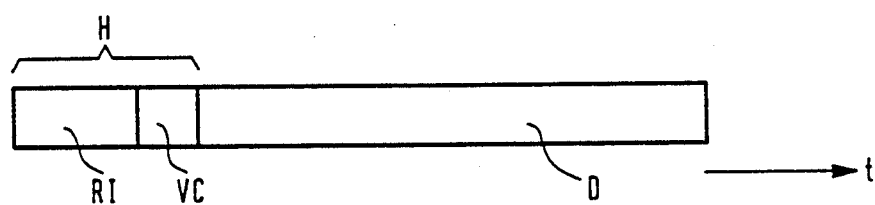
FIG. 2 shows the composition of the packets.

FIG. 2 shows the composition of the individual packets P, consisting of message header H and data D. In the message header H the routing information RI is contained. By means of the identification code VC various virtual channels can be distinguished.

From a bus system formed from feeder lines Z and trunk lines A, a switching network is structured as a space-division multiplex switching network. In the first embodiment represented in FIG. 3 each junction point CP has its own evaluation logic circuit for the information contained in message header H. The packets P supplied through feeder line Z are inserted into the input of the input buffer B in the switching network. The frames received from the subscribers or the preceding packet switch arrangement are shown in a column on the right in input buffer B. By means of a comparator C associated to each junction point CP the address (stored in store SCA) of the trunk lines A arranged in columns is compared to the routing information RI. Each of the trunk lines A has an associated a decision circuit CA, which determines the sequence of the feeder lines Z to be switched through and arranged in rows when the routing information RI is identical to the address of the feeder line Z. In an embodiment of the method according to the invention the sequence is determined by the spatial arrangement of the feeder lines Z, whilst each decision circuit CA cyclically scans all its associated comparators C.

A number of shift registers SR, in which the routing information RI is stored and whose number corresponds with the number of trunk lines A, is connected to the input buffer B. Each shift register SR is connected to the junction point CP and also to the comparator C. The activation input of the associated junction point is connected to the comparator C through the decision circuit CA. The decision circuit CA controls the storing of new routing information RI into shift register SR by means of a release signal ALE applied to a logic circuit.

The logic circuit L connected to input buffer B has a first AND gate U1 and a first OR gate 01. Each first input of the first AND gate U1 and of the first OR gate 01 of the logic circuit L is connected to the decision circuit CA. A start signal I generated in the packet switch arrangement is applied to the second input of the first OR gate 01, whose output is connected to a reset input R of a bistable flipflop RS. A data clock DC generated in the packet switch arrangement is applied to the second input of the first AND gate U1, whose output is connected to the first input of a second OR gate 02. The inverting output of the bistable flipflop RS is connected to a first input of a second AND gate U2, to whose second input a frame clock HC generated in the packet switch arrangement is applied. The ouput of the second AND gate U2 is connected to the second input of the second OR gate, whose output is connected both to the input buffer B and to the shift register SR. An inhibit signal DNH recovered in the packet switch arrangement from the frame clock HC is applied to the set input S of the bistable flipflop RS.

When the bistable flipflop RS supplies a switching signal on its inverting output and the frame clock HC is applied to the second input of the second AND gate U2, the message header H of the first frame in the input buffer B is written into the shift register SR. The comparator C compares the routing information RI contained in the message header H to the address of the trunk lines A arranged in rows and contained in store SCA.

Figure 3:
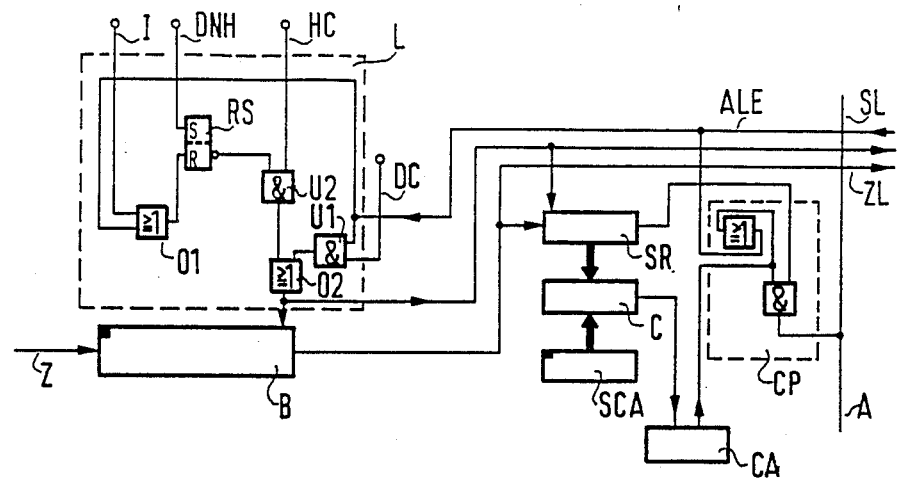
FIG. 3 shows a first embodiment of the switching network control.

If these values are identical a signal from the comparator C is applied to the decision circuit CA and on the basis of the received signals the decision circuit CA determines the sequence in which the feeder lines Z, arranged in rows, are switched through. Thereto, the decision circuit CA applies to the release signal ALE to the input buffer B and realizes a through-connection to the selected junction point CP. With the data clock DC generated in the packet switch arrangement, the data D are switched onto the trunk line through the junction point CP. In FIG. 3 the switching network having the configuration of a space-division multiplex switching network is indicated by the row lead ZL and the column lead SL.

When no routing information RI is contained in the message header H, the routing information RI stored in the shift register SR is not transmitted onto the trunk line A.

Figure 4:
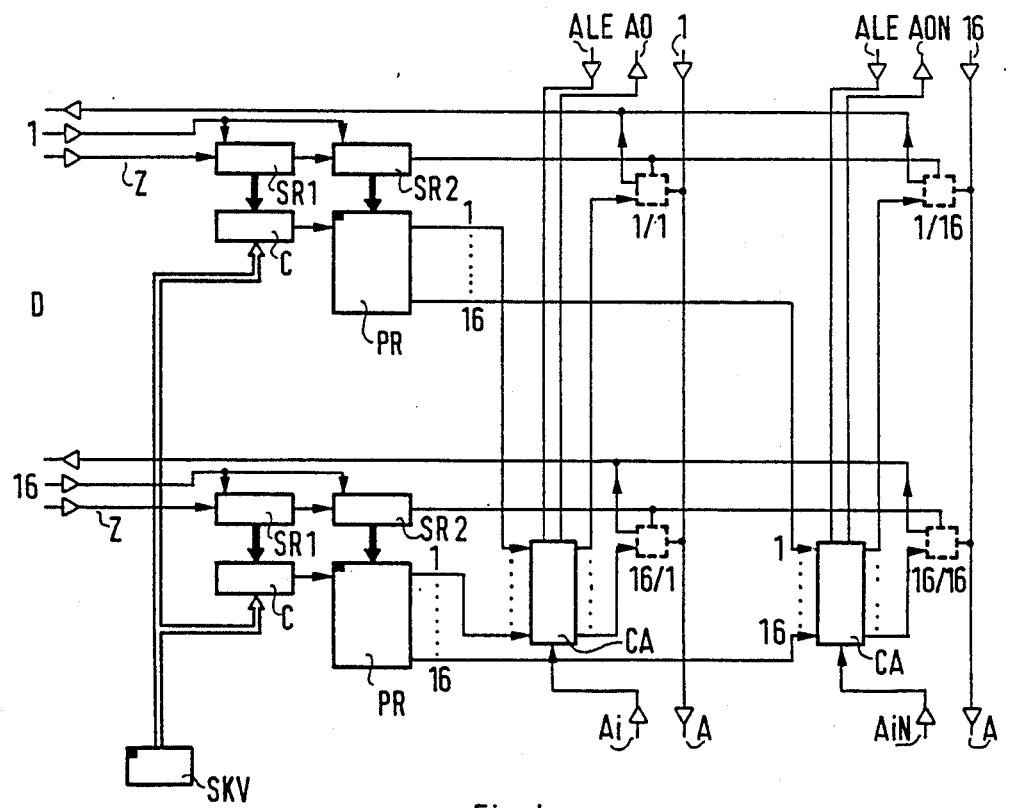
FIG. 4 shows a second embodiment of the switching network control.
Figure 7:
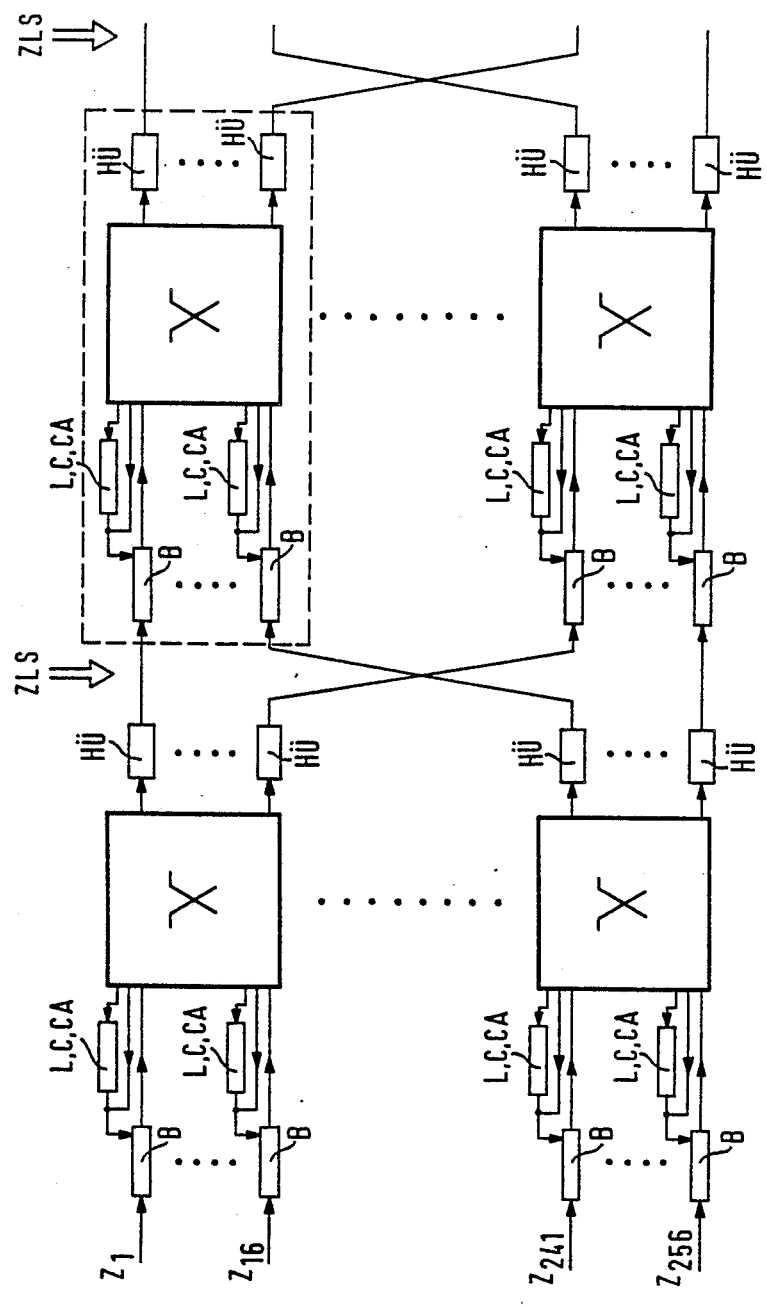

In the combination of junction points CP to form a switching matrix 1/1-1/16-16/1-16/16 as shown in FIG. 4, also the function of the evaluation logic circuit is combined in rows. For example, in FIG. 7, 16 x 16 matrices 701 are shown forming part of a square 256 x 256 configuration. The comparator C compares a first part of the routing information RI with the address of the switching matrix contained in the store SKV. When the two parts match, the trunk line A is determined on the basis of the subsequent second part of the routing information RI and the decision circuit CA associated to this trunk line A is driven.

For this purpose the routing information RI is applied to the series arrangement of two shift registers SR1, SR2. The first shift register SR1 is connected to the comparator C and the second shift register SR2 is connected to an address store PR. The address store PR is connected to the comparator C and also to the decision circuits CA.

The routing information RI is, for example, a nine-bit-word. With the first five bits of the word it is established whether in a series of switching matrices (the embodiment represented in FIG. 4 containing 16 switching matrices) one out of this series of switching matrices is driven. If the five initial bits match with the address of the switching matrix, the respective information of the next four bits of the word is evaluated. On the basis of this information the respective trunk line A is driven and the associated packet P is switched through to this trunk line A. The selection of the trunk lines A is then made by means of the information stored in the address store PR.

When packets P originating from different feeder lines Z are to be applied simultaneously to the same trunk line A, a decision logic is required which consists of a series arrangement of decision circuits CA, associated to the switching matrices of an output line A. The decision circuits CA are connected to each other and constructed such that all feeder lines Z can place their frames onto the desired trunk line A before a processing of further message headers H takes place.

Figure 5:
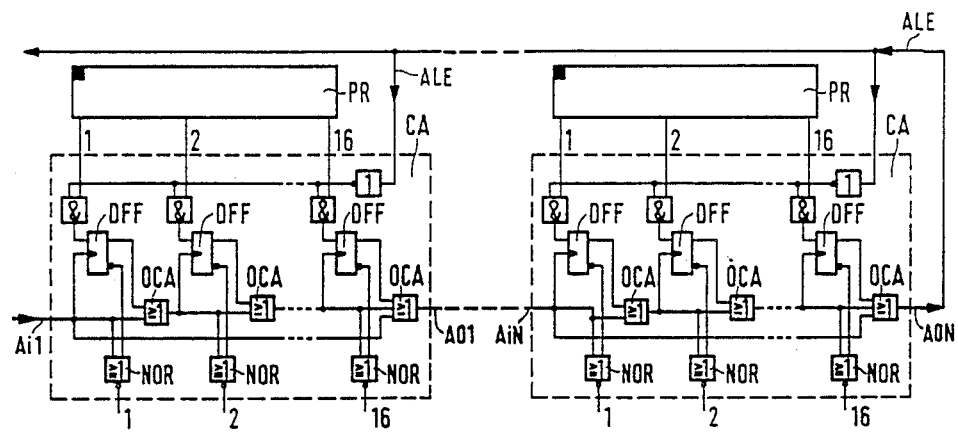
FIG. 5 shows an embodiment of the decision circuit arranged in the switching network control and FIG. 6 shows a third embodiment of the switching network control and FIG. 7 shows a fourth embodiment of the switching network control for implementation of the method according to the invention.

FIG. 5 represents in detail an embodiment of a decision circuit CA. Each decision circuit CA has slope-triggered D flipflops DFF arranged in series. The D input of each D flipflop DFF is connected to the address store PR. The inverting output of each D flipflop DFF is connected to a NOR gate and the non-inverting output of each D-flipflop DFF is connected to an OR gate OCA.

A series switch signal Ai1 generated in the packet switch arrangement is applied to a first input of the first decision circuit CA. The decision output signal AO1, . . . , AON-1 occurring at the first output of each decision circuit CA is applied to the first input of the subsequent decision circuit CA as a series switch signal Ai2, . . . , AiN. The decision output signal AON occurring at the first output of the last decision circuit CA is applied as a release signal ALE to a second input of each decision circuit CA preceding in the series arrangement.

The series switch signal Ai1 or AO1, . . . , AON-1, respectively, is applied to the clock input of the first D flipflop DFF and the output signal of the OR gate OCA preceding in the series arrangement is applied to the clock input of the subsequent D flipflop DFF. The output signal of the OR gate OCA is applied to a further input of the OR gate OCA following in the series arrangement and the series switch signal Ai1, . . . , AiN is applied to a third input of the last OR gate OCA. The functional design of the decision logic described above will be further explained hereinafer.

It is assumed that a cycle has just been finished and that the new input information from the address store PR is applied to the inputs of the decision circuits CA. The series switch signal Ai1 has the logic identification code "low" and all D flipflops DFF have stored the logic identification code "LOW". Thus, a decision output signal AO1, . . . , AON having the logic identification code "LOW" is present at the first output of each decision circuit CA.

If a positive edge occurs in the series switch signal Ai1, this signal travels through each decision circuit CA with a gate delay and the input data are taken over in the D-flipflop DFF. As long as a D-flipflop DFF has stored a signal having the logic identification code "HIGH", all decision output signals AO1, . . . , AON occurring at the first output of each decision circuit CA have the logic identification code "HIGH".

When the series switch signal Ai1 assumes the logic identification code "LOW", the first junction point CP in the chain, which has a D flipflop DFF with the logic identification code "HIGH", will switch. This D flip-flop DFF simultaneously inhibits by means of its non-inverting output all further junction points CP in the chain. After the data are read over the activated junction point CP, a new positive edge in the series switch signal Ai1 will be generated in the packet switch arrangement. Consequently, the D flipflop DFF which was active a moment earlier is reset and the logic identification code "LOW" is assumed. When the series switch signal Ai1 again assumes the logic identification code "LOW", the next junction point CP, whose associated D flipflop DFF has stored the logic identification code "HIGH", can switch. The cycle thus described is extended until the last active D flipflop DFF in the chain has been reset.

At the next positive edge of the series switch signal Ai1, input data can again be received by the D flipflop DFF. This edge may fall in the fixe dmatrix of the positive edge of the series switch signal Ai1. Due to a change of edge in the release signal ALE the last aactive D flipflop DFF can be reset without modifying the method according to the invention, so that the input data can be received more rapidly.

Figure 6:
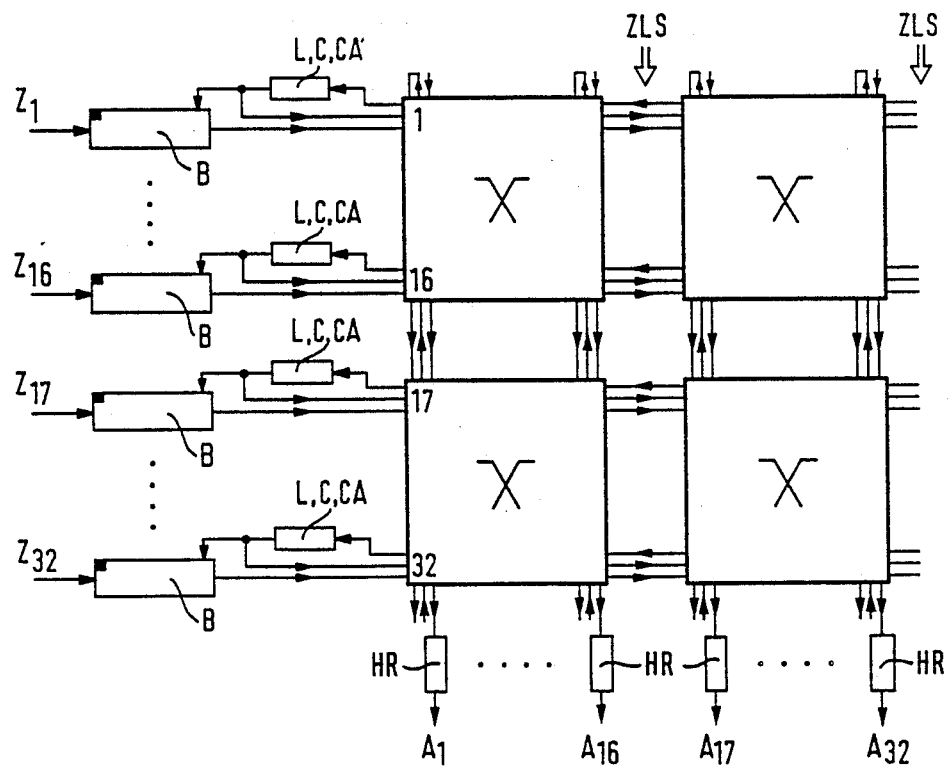

FIG. 6 shows how larger quadratic switching networks can be arranged by using the embodiment shown in FIG. 4. This embodiment also requires not more than a single input buffer B per line. In each row not more than a single switching point CP switches at the same time. If the data have to be switch through to a still further switching network, a rotation of data is effected in the portion of the message header H containing the routing information RI, so that henceforth the information relevant to the subsequent switching network is in first position in the message header H. For this purpose a message header rotation circuit HR is provided.

In order to avoid the quadratic increase of junction points CP in case of a plurality of feeder lines Z and trunk lines A, a so-called intermediate line system ZLS as used with space-division multiplex switching networks in the telephone switching technique can be provided.

As each switching matrix 601 switches through irrespective of the other switching matrices, the identification of a single matrix can be disspensed with (which means cancelling of the five-bit portion of the word). An m -stage switching network in such an embodiment contains a number of m routing information data RI in the message header, which are processed stage-by-stage. Consequently, a message header rotation circuit HR is provided for each switching matrix 601 in each trunk line H. Furthermore, for each stage of the multi-stage switching network a set of input buffers B is required: compare FIGS. 7 for m=3. Evidently, the components shown in the dashed line box can be utilized as basic elements for constructing larger switching networks. In networks without routing information RI occurring in the message header H, a header translation circuit HU can be inserted instead of a message header rotation circuit HR when the routing information RI is restricted to one entry.

What is claimed is:

1. A method for switching packets through a bus system, the method comprising the steps of:
    (a) receiving and storing at least one respective packet at a respective at least one of a plurality of feeder lines, which feeder lines are respective rows of a space-division multiplex switching arrangement, each packet including routing information;
    (b) simultaneously comparing, at each respective feeder line, any routing information received on the respective feeder line with addresses of trunk lines which are columns of the arrangement;
    (c) activating at least one junction point between one respective feeder line and one respective intended trunk line based on a result of said comparing step; and
    (d) when more than one packet is received simultaneously on different feeder lines, and said more than one packet are intended for a single trunk line, determining an order of the different feeder lines to be switched through using a plurality of decision circuits, one associated to each trunk line of the arrangement, so that the more than one packet are switched through the arrangement according to an asynchronous time-division technique.

2. The method of claim 1, wherein the determining step comprises cyclically scanning results of said comparing step, whereby the order is determined according to a spatial arrangement of the feeder lines.

3. The method of claim 1, wherein
    (a) the arrangement includes at least one switching matrix of junction points such that one junction point joins each feeder line/trunk line pair in the matrix; and
    (b) the comparing step comprises:
        (i) first comparing a first part of the routing information with addresses of the matrix; and
        (ii) upon a positive result of the first comparing step, second comparing a second part of the routing information with addresses of the trunk lines within the matrix; and
    (c) the determiningn step comprises driving a decision circuit associated with the intended trunk line based upon a result of the second comparing step.

4. The method of claim 3, wherein
    (a) the arrangement includes a plurality of switching matrices joined to form a multi-stage switching network; and
    (b) the method further comprises the step of through-connecting the matrices.

5. The method of claim 4 wherein said through-connecting step comprises using a message header rotation circuit.

6. The method of claim 4 wherein said through-connecting step comprises using a header translation circuit.

7. A method for controlling a bus system for packet switching comprising the steps of:
    (a) receiving unit packets at a space-division multiplex switching arrangement, which includes a plurality of feeder lines arranged in rows, a plurality of trunk lines arranged in columns, and a plurality of junction points for coupling the rows and the columns, each unit packet including routing information; and
    (b) switching the unit packets through the arrangement from the feeder lines to the trunk lines according to an asynchronous time-division technique, said switching comprising the sub-steps of:
        (i) comparing addresses of the trunk lines to the routing information by means of a plurality of comparators associated with the junction points; and
        (ii) determining, in the case of a multiple match, an order of the feeder lines to be switched through, the determining occurring in a plurality of respective decision circuits associated with the trunk lines.

8. The method of claim 7, wherein the determining step comprises cyclically scanning all comparators associated with the respective trunk lines, whereby the order is determined according to the spatial arrangement of the feeder lines.

9. The method of claim 7, wherein
    (a) the comparing step comprises:
        (i) first comparing a first part of the routing information with an address of a switching matrix which includes a plurality of junction points; and
        (ii) second comparing a second part of the routing information with information for identifying a trunk line, when the first comparing step results in a match; and
    (b) the determining step comprises, driving, in response to a match in the second comparing step, a respective one of the decision circuits associated with the identified trunk line.

10. Apparatus for controlling a switching network, which switching network includes a plurality of feeder lines arranged in rows, a plurality of trunk lines arranged in columns, and a plurality of junction points for coupling the rows and the columns, the apparatus being for a packet switching system and comprising:
    (a) a plurality of input buffers, one coupled with each feeder line, for storing received packet which contain routing information;

(b) a plurality of shift registers for storing the routing information, a number of the shift registers, which corresponds to a number of trunk lines, being coupled with each input buffer, each shift register being coupled with a respective one of the junction points;

(c) a plurality of comparators, one associated with each junction point and coupled with the respective shift registers, for comparing the routing information with addresses of the trunk lines;

(d) a plurality of logic circuits, each respective logic circuit being associated with a respective one of the junction points, for controlling supply of one of the received packets from an input buffer to a trunk line; and (e) a plurality of decision circuits, each respective decision circuit associated with a respective one of the trunk lines and coupled with the respective comparators which correspond to the respective one of the trunk lines, each respective decision circuit being coupled with the respective comparators which are associated with the respective junction points which are associated with the respective one of the trunk lines, each of the decision circuits controlling the respective logic circuits so that, if the routing information matches an address of the respective one of the trunk lines, the one packet is supplied to the respective one of the trunk lines, the decision circuits also determining, in case of a multiple match, an order of feeder lines to be switched through and controlling entry of new routing information into the respective shift registers.

11. The apparatus of claim 10 wherein each logic circuit comprises:

(a) a first AND gate, having a first input coupled with an output of the respective decision circuit, a second input for receiving a data clock, and an output;

(b) a first OR gate, having a first input coupled with an output of the respective decision circuit, a second input for receiving a start signal, and an output;

(c) a bistable flip flop having a reset input coupled with the output of the first OR gate, a set input for receiving an inhibit signal recovered from a frame clock and an inverting output;

(d) a second OR gate having a first input coupled with the output of the first AND gate, a second input, and an output coupled with the respective input buffer and the respective shift register; and (e) a second AND gate having a first input coupled with the inverting output of the bistable flip flop, a second input for receiving the frame clock, and an output coupled with the second input of the second OR gate.

12. Apparatus for controlling a switching network in a packet switching system, which includes a plurality of feeder lines arranged in rows, a plurality of trunk lines arranged in columns, and a plurality of junction points, arranged into a plurality of switching matrices, for coupling the rows and the columns, the apparatus comprising:

(a) a plurality of input buffers, one coupled with each feeder line, for storing received packets which contain routing information;

(b) a plurality of shift registers associated with the respective feeder lines for storing routing information;

(c) a plurality of comparators associated with the shift registers for first comparing the routing information with addresses of the switching matrices and, upon a match, for second comparing the routing information with addresses of trunk lines within switching matrices;

(d) a plurality of logic circuits, associated with the junction points, for controlling supply of received packets from an input buffer to a trunk line; and (e) a plurality of decision circuits, coupled in series and associated with the trunk lines, for, upon a match in the second comparing, driving the respective logic circuit associated with the junction point defined by the match and for, in the cae of a multiple match, determining an order for driving the respective logic circuits and controlling entry of new routing information into the respective shift register.

13. The apparatus of claim 12 wherein (a) the plurality of shift registers is a plurality of respective pairs of first and second shift registers, one pair for each feeder line, the first shift registers being coupled with respective ones of the comparators;

(b) the apparatus further comprises a plurality of respective address stores, one for each feeder line, coupled with respective ones of the comparators, the second shift registers and the decision circuits.

14. A circuit arrangement as claimed in claim 13, characterized in that the decision circuits (CA) in a series arrangement are connected to one another such that a series switch signal (Ai) generated in the packet switch arrangement occurs at a first input of the first decision circuit (CA), in that a decision output signal (AON) occurring at the first output of each decision circuit (CA) is applied to the first input of the subsequent decision circuit (CA) as a series switch signal (AiN) and in that the decision output signal (AON) occurring at the first output of the last decision circuit (CA) is present at a second input of each decision circuit (CA) preceding in the series arrangement.

15. A circuit arrangement as claimed in claim 14, characterized in that each decision circuit (CA) has edge-triggered D flipflops (DFF) connected in series, in that the D output of each D flipflop (DFF) is connected to the address store (PR) and in that the inverting output of each D flipflop (DFF) is connected to a NOR gate (NOR) and the non-inverting output of each D flipflop (DFF) is connected to an OR gate (OCA).

16. A circuit arangement as claimed in claim 15, characterized in that the series switch (Ai, AON) occurs at the clock input of the first D flipflop (DFF) and the output signal of the OR gates (OCA) connected in series occurs at the clock output of the subsequent D flipflops (DFF) which output signal, in addition, is present at a further input of the OR gates (OCA) and in that the series switch signal (Ai, AON) is present at a further input of the last OR gate (OCA).

* * * * *